United States Patent [19]

Richt et al.

[11] 3,767,137

[45] Oct. 23, 1973

[54] DRIVE DEVICE FOR TAPE RECORDERS

[75] Inventors: Oskar Hubert Richt, Socking; Albert Liebl, Starnberg, both of Germany

[73] Assignee: Uher Werke Munchen, Munich, Germany

[22] Filed: Apr. 21, 1970

[21] Appl. No.: 30,509

[30] Foreign Application Priority Data

Apr. 25, 1969 Germany .................. P 19 21 300.4

[52] U.S. Cl. .................. 242/206, 242/208, 274/4 D, 274/4 C

[51] Int. Cl. .................. G11b 5/00

[58] Field of Search .... 242/199–202, 206, 208, 209; 274/4 R, 4 A, 4 B, 4 C, 4 D, 11 R, 11 A, 11 B, 11 C, 11 D

[56] References Cited

UNITED STATES PATENTS

| | | | |
|---|---|---|---|
| 2,858,996 | 11/1958 | Switzer | 242/202 |
| 3,016,208 | 1/1962 | Herrmann | 242/202 |
| 3,130,934 | 4/1964 | Richt et al. | 242/201 |

FOREIGN PATENTS OR APPLICATIONS

| | | | |
|---|---|---|---|
| 6,715,918 | 5/1968 | Netherlands | 274/4 C |

*Primary Examiner*—Harry N. Haroian
*Attorney*—Stevens, Davis, Miller & Mosher

[57] ABSTRACT

A drive device for a cartridge or cassette tape recorder comprises two oppositely rotating flywheels which each have a tape capstan, and furthermore two oppositely rotating drive wheels. The flywheels and the drive wheels are driven by the single motor via belts. For playback or recording of a track of the tape a pressing roller is pressed against one of the capstans so as to cause engagement and transport of the tape and a drive wheel is so displaced axially on a stationary pin that it raises an associated driven wheel from a stationary braking disc. For playback of the other track of the tape a further pressing roller is pressed against the other capstan for the purpose of engaging the tape and the other drive wheel is raised in order to raise its associated driven wheel from a further stationary braking wheel. The driven wheels are connected in a rotation transmitting manner with spool driving spigots which fit into driving openings in the tape spools arranged in the tape cassette.

11 Claims, 11 Drawing Figures

DRIVE DEVICE FOR TAPE RECORDERS

BACKGROUND OF INVENTION

1. Field to which Invention Relates

The present invention relates to driving arrangements for tape recorders, and more particularly to such driving arrangements for cartridge or cassette tape recording equipment.

2. Prior Art

Drive devices for cartridge tape recorder have been proposed which comprise two flywheels rotating in opposite directions and a capstan for driving the tape is driven by one flywheel. Such devices possess the advantage that inertial forces or accelerating forces acting on the flywheels cancel each other out. The tape recorder can therefore be swung backwards and forwards without "howling" occurring owing to changes in the speed of rotation of the capstan. Such tape recorders are particularly suitable for use in vehicles in a suitable slide-in pocket, since in the case of this particular application it is also particularly important that forces occurring during driving do not result in a change in the speed of transport of the tape. For the recording and playback quality of the tape recorder and for even running quality it is not only necessary, however, to ensure that the speed of rotation of the capstan is kept constant. The known devices have the disadvantage that the drive of the take-up spool is derived from the drive of the flywheels. Thus the different power requirement of the takeup spool, for example on the basis of changes in the diameter of the tape wound on the spool and variations and vibrations affect tape speed and the evenness of running.

SUMMARY OF THE INVENTION

One object of the invention is to provide a drive device for a tape recorder in such a manner that acceleration forces which act upon the tape recorder when it is being carried or being used in a motor vehicle have only a strictly minimum effect on the quality of the tape recording and tape playback. Nevertheless a substantial separation of the drive of the capstan from the drive of the flywheels is to be achieved so as to improve even running qualities.

More particularly the drive device is intended for a small cassette or cartridge tape recorder which is to be used for recording and playback so that the tape recorder is suitable for professional or commercial purposes, for example for preparing tape recordings for broadcasting.

A further object of the invention is to construct the drive device in such a manner that both the flywheels carrying the capstans, and also the drive wheels for driving the spool engaging pins constantly turn in opposite directions of rotation independently of whether the tape is transported in one direction or the opposite direction with the slower standard or normal speed, or with the faster rewind speed.

A further object of the invention is to construct the drive arrangement in such a manner that at the end of the tape an automatic switching over to the other direction of travel of the tape is achieved.

A still further object of the invention is to provide an improved bearing arrangement for the capstans, which ensures that each capstan is held at both end faces for avoiding any possibility of axial displacement.

A still further object of the invention is to construct the drive device in such a manner that the drive motor is switched off when the tape is completely wound up on one spool or when the winding operation is impeded.

A still further object of the invention is that of providing a single drive motor with a load-independent speed characteristic as a buffer between the drives for the drive wheels and the flywheels.

Further aims and objects of the invention will appear from the following particular description which refers to a preferred embodiment of a drive device for a tape recorder of the cartridge or cassette type.

The invention is described with reference to the drawing.

LIST OF FIGURES OF DRAWINGS

DESCRIPTION OF PREFERRED EMBODIMENTS

The cartridge or cassette tape recorder in accordance with the invention comprises a rectangular housing 1 whose shape and size are so selected that inter alia it can be used in motor vehicles in which it is slid into a suitable mount or compartment. The housing 1 comprises a front plate 2, on which all operating elements are arranged. In a T-shaped slot guide in the front plate switching button 3 is mounted and can be moved into anyone of four positions, that is to say in the position shown in FIG. 1, to the right for "tape drive for track 1", into the left hand position "tape drive for track 2" and into an upper position "rapid stop". In the lower central position only the drive motor is switched on.

Figure 1:
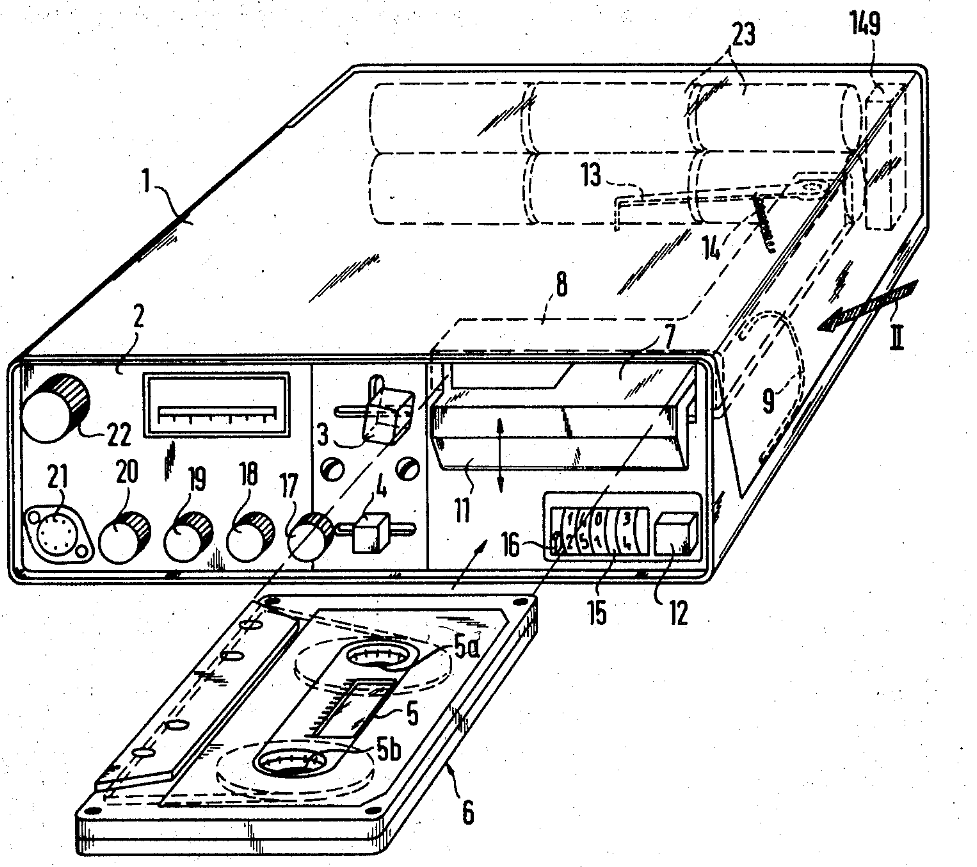
FIG. 1 shows a cartridge type tape recorder in perspective from the front with a cassette ready to be inserted.

Underneath this there is a rewind button 4, which has a central neutral position as shown. A tape 5 is contained in a commercially available cartridge 6 or cassette and is mounted on two tape spools arranged with a spacing between them. The tape spools are provided with drive openings *5a*, *5b* for forward and reverse winding of the tape 5. The front plate 2 is provided with a slot 7 for insertion of the cartridge, as is shown in FIG. 1.

In the housing 1 a cartridge receiving part 8 is arranged so that it can move against the action of a spring 9. After the introduction of the cartridge 6 into the cartridge receiving part 8 an elongated handle 11 is used to press the cartridge receiving part downwards against the action of the spring 9, so that the cartridge 6 is brought into the working position and, as will be described with reference to FIG. 2 below, the cartridge receiving part 8 snaps into place. For removal of the cartridge 6 a cartridge removal button 12 is pressed inwards, which unlocks the cartridge receiving part 8, so that the latter snaps upwards owing to the action of the spring 9. Following this a cartridge ejector 13, which is loaded by a tension spring 14, throws the cartridge 6 out. Underneath the elongated handle 11 a counter 15 is provided, with a zeroizing button 16. Reference numerals 17, 18, 19 and 20 denote operating buttons or knobs for the electric part, such as "record" and "playback". As will be described later with reference to FIG. 3, this button 17 is locked in the starting positions of the switching button 3 (that is to say in the left hand position, in the central position or the right hand position) and can only be actuated in the stop position of the switching button 3. Reference numeral 21 denotes a connecting socket while reference numeral 22 denotes a regulating button or knob.

In the rear part of the housing 1 six batteries 23 are accommodated in longitudinal positions.

Figure 2:
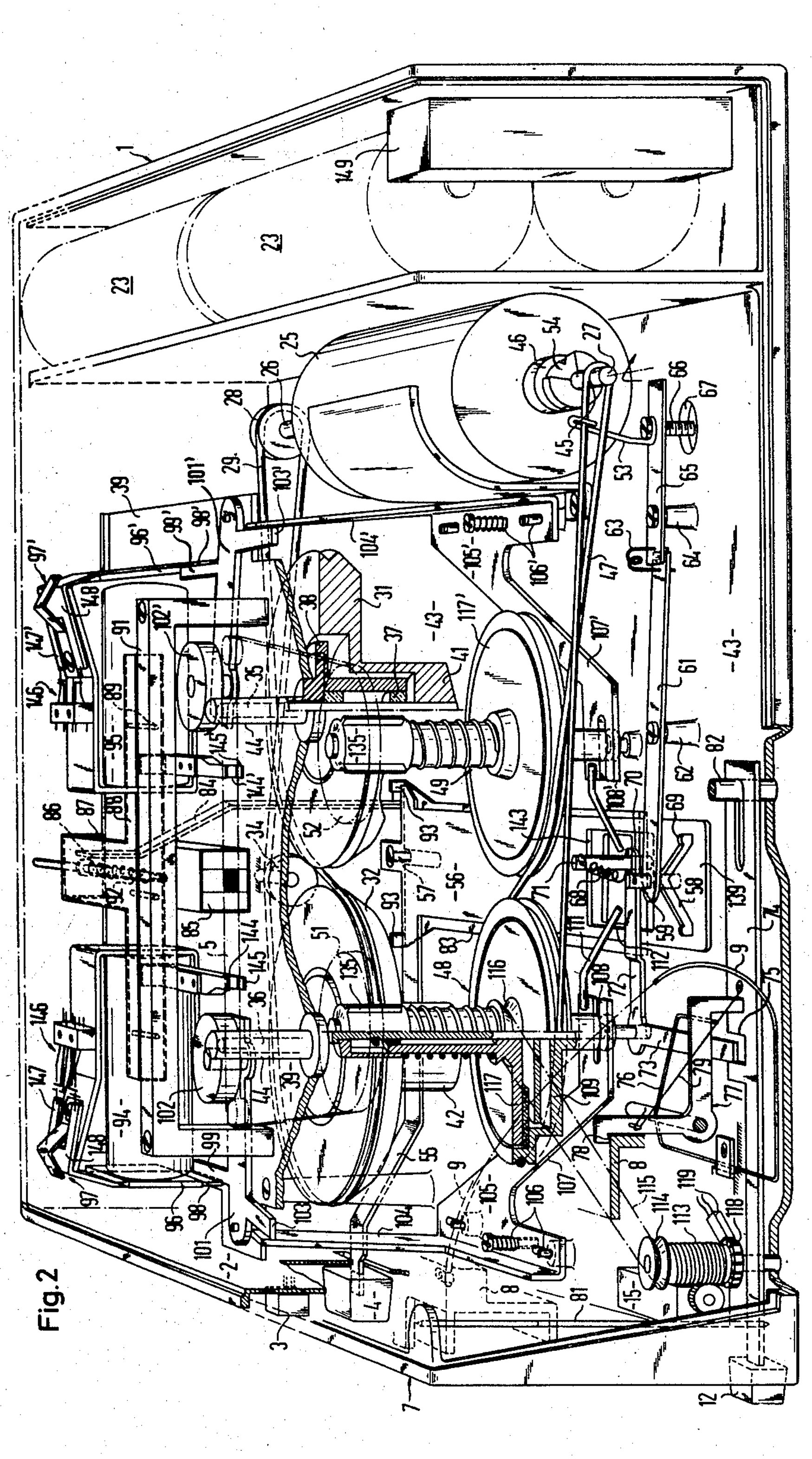
FIG. 2 is a perspective view looking in the direction of the arrow II of FIG. 1 to show the mechanism of the cartridge tape recorder.

Referring now to FIG. 2 the tape recorder belt drive device with associated clutches and the drive of the flywheels with the associated capstans will be described.

A single drive motor 25 has at opposite ends two shaft stubs 26, 27 which only rotate steadily in the direction of rotation as indicated by the arrow. The direction of rotation of the motor is not changed for the different operating conditions, recording or playback, forward wind or reverse wind of the tape (track 1 or track 2), "rapid forward tape wind" or "rapid tape reverse wind" of the tape recorder. This provides for substantial advantages, more particularly also as regards the recording and playback qualities of the tape recorder, and also as regards rapid change in the direction of movement and reliability in operation.

Figure 4:
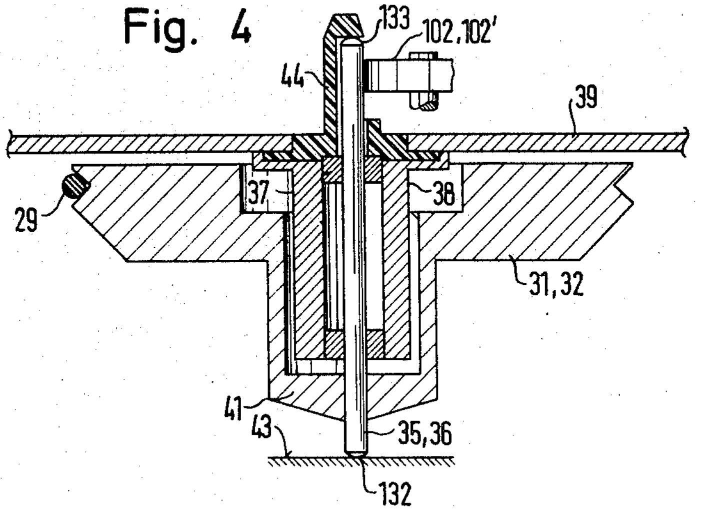
FIG. 4 is a section through a capstan bearing arrangement with the associated flywheel.

On the shaft stub 26 there is a pulley 28, which drives a belt 29 whose limb under tension passes in an anticlockwise direction about a flywheel 31 and then in a clockwise direction about a flywheel 32. A guide roller 34 ensures a satisfactory return movement of the return run or limb of the belt 29 to the belt pulley 28. Each flywheel 31, 32 carries a capstan, the capstans being given the reference numerals 35 and 36 respectively. The tape recorder thus is provided with two capstans which are spaced apart, the one capstan transporting the tape 5 in "track 1" operation while the other transports the tape in "track 2" operation. Owing to the configuration of the belt 29 the flywheels 31, 32 are driven in opposite directions so that the effect of external angular accelerations does not result in variations in the speed of rotation of the capstans 35, 36. The tape recorder can therefore be swung backwards and forwards while the operator is walking without any "howling" occurring. The capstans 35, 36, see FIG. 4, are connected with an intermediate carrying plate 39 via radial bearings 37 and flange bearing housings 38. The flywheels 31, 32 have their extensions 41, 42 force-fitted on the lower ends of the capstans 35, 36. The lower ends of the capstans 35, 36 are constructed in a domed manner as indicated by reference numeral 132 in FIG. 4 and are axially supported in bearing dishes (not shown) in the bottom 43 of the housing. At their upper ends the capstans 35, 36 are also constructed with domed surfaces (133) and are each engaged axially by a plastic dish part in an extension 44 of the flange bearing housing 38.

The shaft stub 27 of the motor 25 has a two-speed pulley with a smaller diameter 45 and a larger diameter 46. The diameter 46 can correspond to the diameter of the motor shaft. Via driven belt 47 and via clutches 48, 49 tape spools 51, 52 are driven, the run or limb of the belt 47 under tension passing in a clockwise direction about a clutch 48 and in an anticlockwise direction about the clutch 49 so that in this case as well there is rotation in opposite directions. In the recording and playback setting of the tape recorder the belt 47 runs on the pulley part with the smaller diameter 45. The part with the larger diameter 46 is for rapid return and rapid forward winding. The change over from slow running to rapid running by changing over the drive belt 47 is carried out using a control fork 53 to change the belt over, from one pulley diameter to the other. A notch 54 facilitates the transition of the belt 47 up on to the pulley part with the greater diameter 46. The movement of the change over fork 53 for operating the belt is initiated by actuation of the rewind button 4. This button can be slid in a slot in the front plate 2, so that the tape is rapidly wound in the direction in which the rewind button or knob 4 is displaced, generally "forward wind" on movement in the left hand direction while on movement in the right hand direction "reverse wind" takes place. The rewind button 4 or knob is arranged on a limb 55 of a bell crank 56 which pivots about a screw 57. On the other limb 139 of the bell crank 56 a V-shaped cam 58 is provided which pivots a lever 61 via a follower pin 59. The lever is pivotally mounted at 62 and its right hand end pivots the lever 65 (which is pivoted at 64) via a spring element 63. The lever 65 carries the change speed fork 53. The change speed fork 53 is attached to lever 65 by means of a screw 66 which limits the travel of the lever by abutting against the edges of a hole 67 in the base plate 43. The spring element 63 makes possible an evening out of movement which is necessary since a small time lag has to be allowed for the drive belt 47 to change over between the pulley parts with the two diameters 45 and 46.

The follower pin 59 is held by force of the spring 68 against the cam or ramp 58 and in the terminal positions can snap into detent notches 69. The other end of the spring 68 is connected with a holding pin 71 which is attached to an operating rod 83. A bell crank 72 has a forked end 70 fitting around the pin 71. Another limb 73 of the bell crank 72 engages an operating rod 74 at 75. The front end of the rod has the cartridge removal button 12 fixed to it. A latch lever 77 is moved by s further limb 76 of the spring 9 in the left hand direction so as to engage a suitable edge 78 on the cartridge receiving part 8 so that the latter is held in position. For removal of the cartridge the button 12 is pressed so that driving wire 79 swings the latch lever 77 to the right and brings it out of engagement with the edge 78. The cartridge receiving part is consequently released and flips upwards owing to the action of the spring 9. In this respect the cartridge receiving part 8 is guided by the guide rods 81 and 82, only the lower part of the guide rod 82 being shown broken away.

On removal of the cartridge and on moving the cartridge receiving part 8, upwards a sound head 85, which co-operates with the tape 5, is retracted via an operating rod 84. This operating rod 84 is mounted perpendicularly on the end of operating rod 83, which is displaced with the pin 71 and with the forked end 70 of the bell crank 72 when the operating rod 74 is moved upon actuation of the cartridge removal button 12. The upper end 86 of the operating rod 84 presses on an extension 87 of a carriage 88 which is guided on three pins 89 on a bridge piece 91. On this carriage 88 the sound head 85, possibly together with an erasing head, is mounted so that the sound head is withdrawn with the carriage 88. The withdrawal of the sound head 85 is carried out against the force of a spring 92. The sound head 85 is also raised when the bell crank 56 is moved on displacement of the rewind button 4. In this respect the operating rod 83 and therefore the operating rod 84 is moved via projections 93.

For operation of the tape recorder in normal running with tracks 1 and 2 the operating button 3 is used to switch on an associated electromagnet 94 or 95 as the case may be. The magnet 94 attracts an armature plate 96, which pivots on a knife edge 97, the projection 99 of a pivoting lever 101 being moved with the latter by an extension of plate 96. Owing to the pivoting of the pivoting lever 101 in a clockwise direction, a pressing roller 102 presses the tape 5 against the capstan 36 so that tape transport begins. Simultaneously an extension 103 of lever 101 acts on a limb 104 of a bell crank 105 and swings the latter in a clockwise direction about its resilient bearing means 106, so that the limb 107 is slightly reaised and its forked end 108 actuates the clutch 48. The construction and manner of operation of the clutches 48 and 49 is shown in detail in FIGS. 6 to 10.

Each of the clutches 48 and 49 is provided with a drive wheel 109 and 109′ respectively which is recessed and has faces 109*a* and 109*a*′. The drive wheels are constantly driven in opposite directions. The speed on rewinding is, however, as described above, higher than in normal functions "recording" and "playback". The drive wheel 109, 109′ is arranged on a stationary bearing pin 137 and 137′ so as to be capable of being moved axially. A braking disc 138 and 138′ is fixed so as not to be capable of rotating. Furthermore, on the pins 137 and 137′ driven wheels 117 and 117′ are arranged to slide axially. Each wheel possesses a boss-like extension 141, 141′, which has a helical compression spring 136, 136′ mounted on it. The spring 136, 136′ abuts against the driven wheel 117, 117′ on the one hand and against a spool drive spigot 135 and 135′ on the other hand; the spool drive spigot 135 and 135′ is driven in rotation by the driven wheel 117, 117′ respectively. Each spool drive spigot 135 and 135′ has a blind hole 135*a* and 135′*a*, with a polygonal cross section. It slides axially on the boss-like extension 141 and 141′ of the driven wheel 117 and 117′ which has a matching cross section. The spool driving spigot 135, 135′ is pressed by the helical spring 136 mounted on top of the boss-like extension 141, 141′ against an upper abutment 137*a*, 137′*a* on the pin 137, 137′. Furthermore, on the pin 137 and 137′ an abutment 142 and 142′ is mounted which lies in a blind hole 135*a*, 135*a*′ in the associated spool drive spigot 135 and 135′ and limits the movement of the driven wheel 117 and 117′ in an upward direction. On the lower side of the driven wheel 117 and 117′ there is a felt washer 134 and 134′ of annular shape acting as a braking component.

This arrangement makes possible the transmission of different drive and braking torques from the drive wheel 109 or 109′ rotating constantly in the same direction, to the tape spools 51 and 52 in accordance with the different functions to be performed by the tape recorder.

The drive wheels 109 and 109′ can be raised by swinging the bell crank 105 or 105′ out of a first position into a second position, as has already been described. For the rewinding operation the drive wheel 109 or 109′ is raised past the second position on swinging the rewind button 4, owing to the actuation of the bell crank 56 and an operating wire 111, which abuts against an edge 112 of a recess of the bell crank 56 and which is attached to the fork or the limb 107 or 107′. When the bell crank is moved to the left or to the right until the pin 59 snaps into the detent notches 69 of the V-shaped ramp or cam 58, the operating wire 111, 111′ is pressed upwards until the boss of the driven wheel 117 lies against the abutment 142. The sound head 85 is pushed back by the projections 93 and the operating rod 84 so that there is no possibility of wear of the sound head by friction against the tape. The drive of the counter 15 is via a worm drive 113, a belt pulley 114, a drive belt 115 and a further belt pulley 116 which is mounted on the driven wheel 117 of the clutch 48. If a tape spool 51 or 52 is now empty, the clutch slips. The upper driven wheel 117 and thus the belt pulley 114 halt. On the worm drive 113 conductor elements 118 are provided. When the worm 113 stops, a sensing means 119 ceases to supply pulses to a suitable transistor circuit which then switches off the motor 25. This arrangement is of considerable significance for cartridge tape recorders since in such recorders the tape is permanently connected on the spools. There is therefore no chance of the tape being pressed while held stationary, by the pressing roller 102′ against the rotating capstan. Furthermore, experience has shown that in the case of battery operation switching off of the apparatus is frequently forgotten when one track of the tape has been played, since the tape recorder is then silent. Switching off of the motor ensures that the batteries 23 are not run down.

Figure 3:
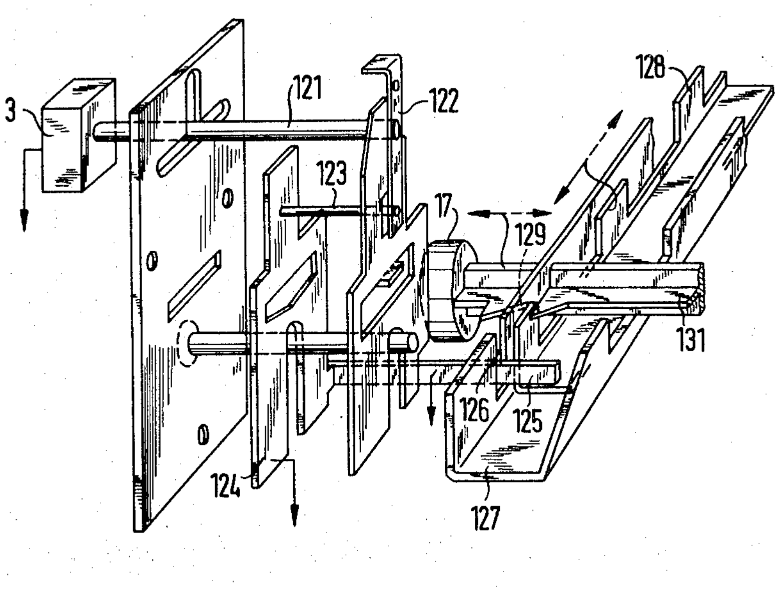
FIG. 3 shows diagrammatically the blocking device for the recording button.

FIG. 3 shows a locking device for the electric switch button 17. In the lower positions of the operating or switching button 3 (track 1 and track 2, motor on) a pin 121, a detent strip spring 122 and a pin 123 move down a plate 124 with a locking extension 125. The latter fits into a slot 126 in a U-shaped rail 127, in which a sliding rail 128 fits so as to provide a locking cooperation with the detent lugs 129 of the operating bar 131, on which the operating button 17 is fixed.

Cartridge or cassette tape recorders should be capable of operating satisfactorily irrespective of the position in which they are placed. Since for providing stabilization of the speed of rotation the capstans are connected with a relatively heavy flywheel 31, 32, strong forces act upon the bearing of the shaft in an axial direction. Moreover in the case of carrying a swinging backwards and forwards of the tape recorder also produces substantial tilting forces. The coefficient of friction of the bearing means should, however, be constant and independent from such factors so that the speed of rotation is not changed. In the case of studio tape recorders the capstan shaft is in some cases journalled at both end faces. However, this was previously considered to be impossible in the case of cartridge tape recorders since the insertion and pressing into position of the cartridge on the driving spigots would be made impossible. In the flange bearing housing 38 provided in accordance with the invention, which is attached by means of its flange on intermediate carrying plate 39, a sleeve-shaped extension 44 is provided as a separate synthetic resin part, which fits over the end projecting above the plate 39. The extension 44 is so cut back that the tape can be held in the pressed-on position by the pressing roller 102, 102' against the capstan 35, 36. Consequently the capstan 35, 36 is held both at its end faces and also in a central part in the radial bearings 37, something which is extremely suitable for the purpose in view.

The manner of operation of the tape recorder is as follows:

After inserting the cartridge 6 the elongated handle 11 is pressed downwards so that the spool driving spigots 135, 135' snap into the star-shaped driving openings *5a, 5b* of the tape spools. If the driving shaft does not fit into the associated opening it is pressed back against the action of the compression spring 136, 136'. It then snaps in when it beings to rotate. After setting the operating button 17 of the electric part, the switching button 3 is pressed downwards. As a result the motor 25 begins to run. Via the driving belt 29 the flywheels 31, 32 and the associated capstans 35, 36 are driven in opposite directions. Furthermore, the wheels 109, 109' are also driven in opposite directions by the drive belt 47. The wheels 109, 109' are in their lowermost position, in which they do not make contact with the driven wheels 117, 117' and therefore run without driving. The inner parts of the felt linings or washers 134, 134' of the driven wheels 117, 117' are pressed by the respective compression springs 136, 136' with a pre-determined pressure against the associated brake disc 138, 138' so that a certain braking moment acting against twisting is obtained. If now the operating button 3 is moved to the right or the left for playing back or recording on the track 1 or the track 2, then, as has been described, one of the drive wheels 109, 109' is raised by the forked end 108 of the limb 107 into the position shown in FIG. 6, the first position "record or playback".

Figures 5, 6:
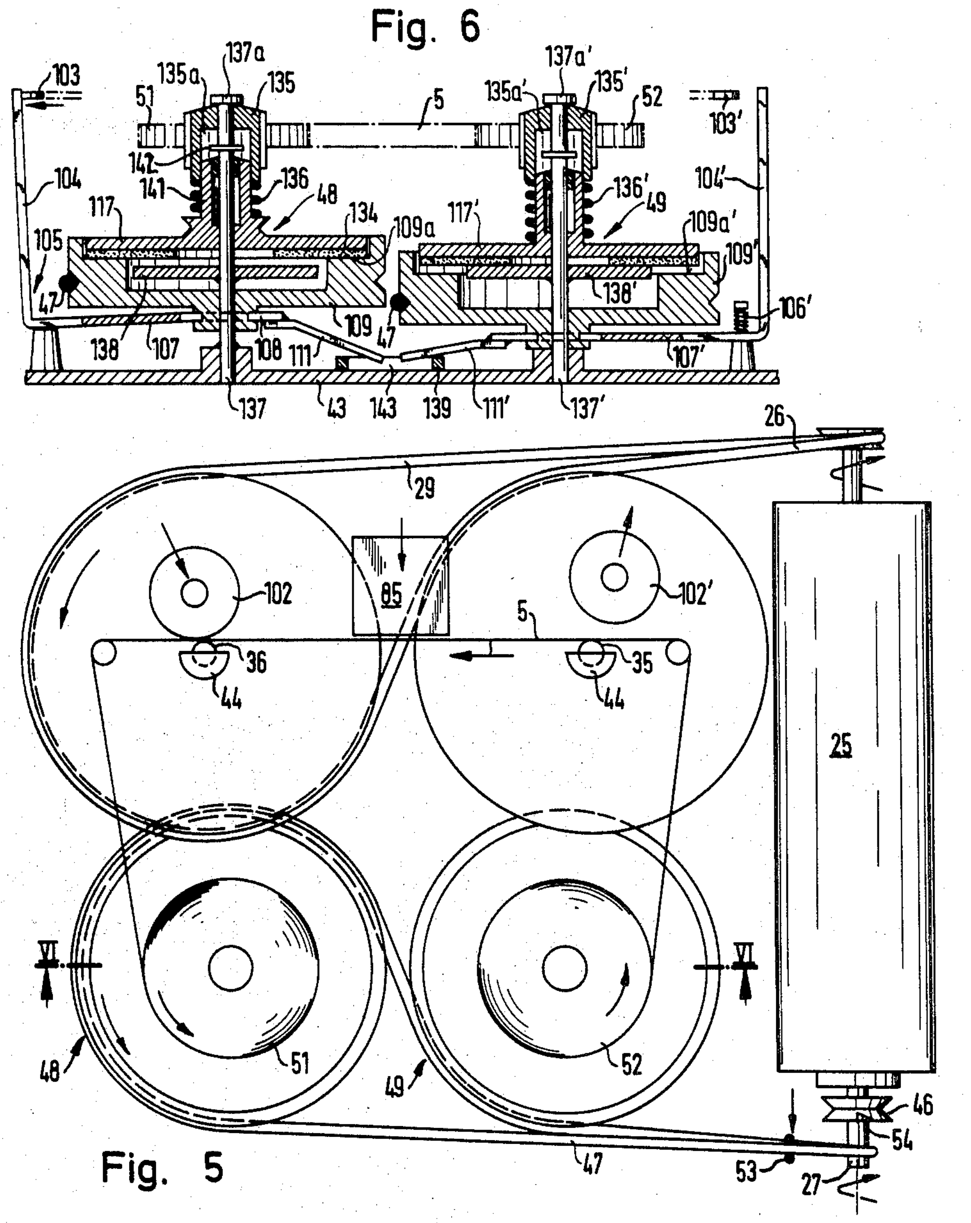
FIG. 5 shows diagrammatically in plan view the tape drive in the recording and playback setting.
FIG. 6 is a section on the line VI—VI of FIG. 5 through the tape drive clutches.

The face 109*a* or 109*a'* of the drive wheel 109 or 109' then comes into engagement with the outer part of the felt lining or washer 134 or 134'. The driven wheel 117 is raised from the brake disc 138. The compression spring 136 is then compressed further. The felt washer 134 of the entraining wheel 117 is pressed with the spring force against an associated surface of the drive wheel. Consequently a certain torque is transferred to the spool drive spigot 135. The tape 5 is transported, in terms of FIG. 6, from the right to the left. Since the drive wheel 109' is still, as was previously the case, in its lower position, the spool drive spigot 135', caused to turn by the movement of the tape, is braked by the felt washer pressed by the spring 136' on the braking disc 138'. The braking moment is, however, owing to the small spring force, the smaller diameter of the braking wheel, substantially less than the driving torque. A particularly significant feature is that despite the continuous rotation of the drive wheel 109, 109' the braking occurs against a stationary braking disc. This ensures that vibrations of the drive wheel 109 are not transmitted from the braked side to the tape 5, something which would lead to a substantial impairment as regards constant speed running. On actuation of the operating button 3, as already described, the tape pressing roller 102 is actuated so that it presses the tape 5 against the shaft 36. The tape pressing roller 102', on the other hand, remains in its swung-back position. The sound head 85 is also pressed against the tape (FIG. 5). On switching over to the other track the drive wheel 109 is lowered and the drive wheel 109' is raised. Similarly the tape pressing roller 102 is swung back and the tape pressing roller 102' is brought into engagement with the tape 5 so that the functions of the rollers are changed over. Since the motor, the flywheel and the drive wheel are still rotating in the same direction, on switching over no inertial slowing down occurs. The tape is immediately transported with its desired speed. The same applies when the operating button 3 was in its central stopping position. This is particularly important in the case of tape recording since distortion effects due to slow switching on are avoided.

Owing to the electrical control of the pressing rollers and winding clutches in normal tape transport it is not only possible to achieve a rapid change in the movement direction of the tape, which can readily be remote controlled, as may be required for repeating work, but following further simplifications in operation are possible:

1. Switched on for start it is possible to rewind and then playback,
2. switched on for start it is possible to change the cartridge and then playback.

Figures 7, 8:
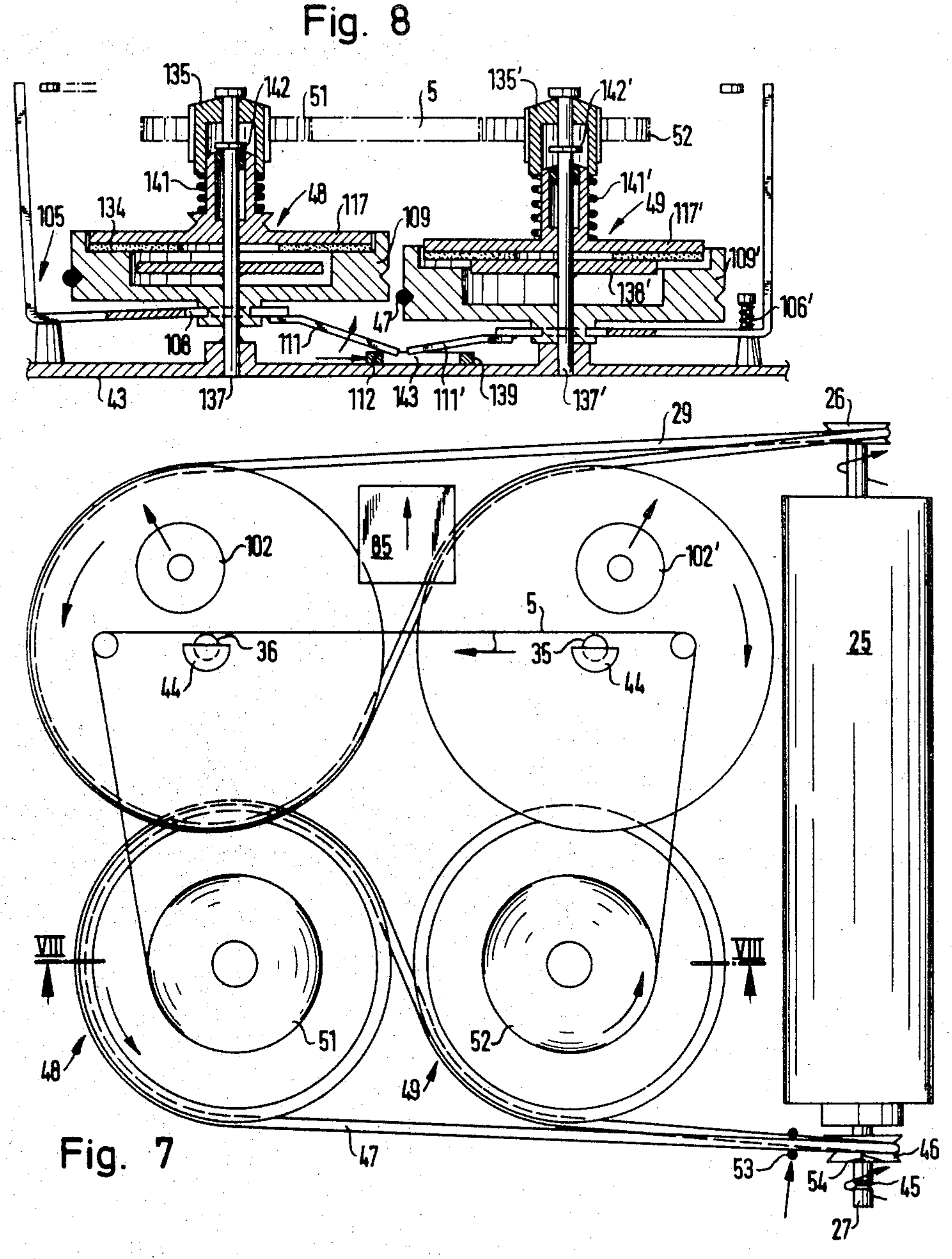
FIG. 7 is a diagrammatic plan view of the tape drive in the "rapid tape advance" position.
FIG. 8 is a section on the line VIII—VIII of FIG. 7 through the tape drive clutches.

When the rewind button 4 is moved into its position "rapid forward wind of the tape" then, as indicated in FIG. 8, the drive wheel 109 is further raised from the operating wire 111 until the upper end face, in the form of a dome, of the extension 141 lies against the abutment 142. Then the fairly strong force to to hand operation acts against the felt washer 134 instead of the lesser pressing pressure of the pressing spring 136. Consequently a higher torque is transmitted than is the case with the normal functioning to the spool driving shaft 135. The operating fork 53 presses the belt 47 towards the motor 25 so that it runs on the pulley part having a greater diameter 46. The driver wheel 109 turns with a higher speed and owing to the high pressing force entrains the driven wheel 117 so that the tape 5 is wound in a forward direction at the highest possible speed. Forward winding occurs against a constant braking force on the tape in accordance with the force of the felt washer 134' on the stationary braking disc 138'. This achieves an evenly taut winding of the tape, this having a favorable effect as regards playback of the tape.

Figure 10:
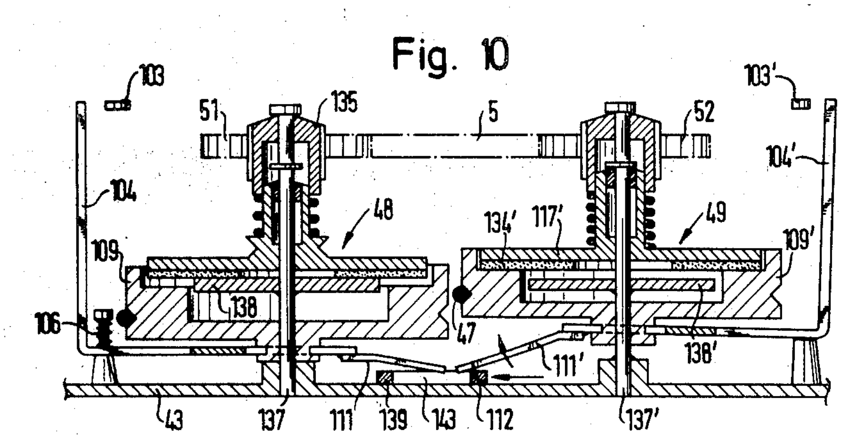
FIG. 10 is a section on the line X—X of FIG. 9.
Figure 9:
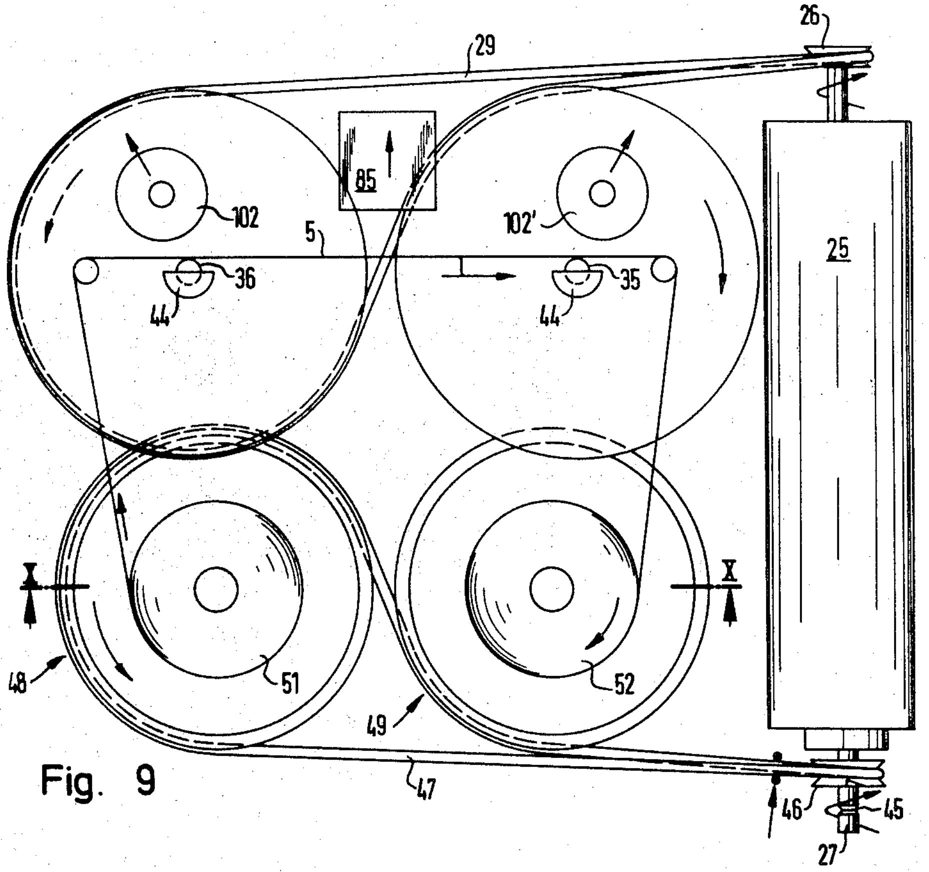
FIG. 9 is a diagrammatic plan view of the tape drive arrangement in the "rapid rewind position".

In this case of the position shown in FIG. 10 "reverse wind" in the roles of the two clutches 48 and 49 are changed over.

Combined with the constant rotation of the motor 25, the flywheels 31, 32 and the drive wheels 109, 109' with one direction of rotation and the same speed of rotation, a particular advantage is due to the fact that the movement of the pressing rollers 102, 102' occurs necessarily simultaneously with the movement of the drive wheels 109, 109', that is to say the movements are caused in each case only by one electromagnet 94 or 95, the attraction of the plate 96 or 97 bringing about a swinging of the swinging lever 101 or 101' carrying the pressing roller 102 or 102' and simultaneously the fork end 108 or 108' is raised. This means that distortion due to starting is avoided. The tape cannot slip as might be the case if there were a time lag in the engagement of the tape by the pressing roller between the roller and the capstan. The tape is therefore suitable for high quality recording operation, for example sound controlled stopping and starting, mixing, blending in, etc. The tape recorder also possesses erasing heads 144 and 144', which are also attached as is the case with the sound head 85 on the slide 88, so that on winding operations they are also raised clear of the tape 5. The switching on of the corresponding erasing head or sound head is carried out using the corresponding switch means 146, 146' which are arranged on the associated electromagnets 94, 95 and are actuated by limbs 147, 147' of knife bearing upper part 148, 148'.

On the rear side of the housing 1 there is a further socket 149. In order to save the batteries 23 this socket is used for current supply when the device is inserted into a compartment in the dash board of a motor vehicle or in a large piece of electrical equipment, for example a radio or record player.

Figure 11:
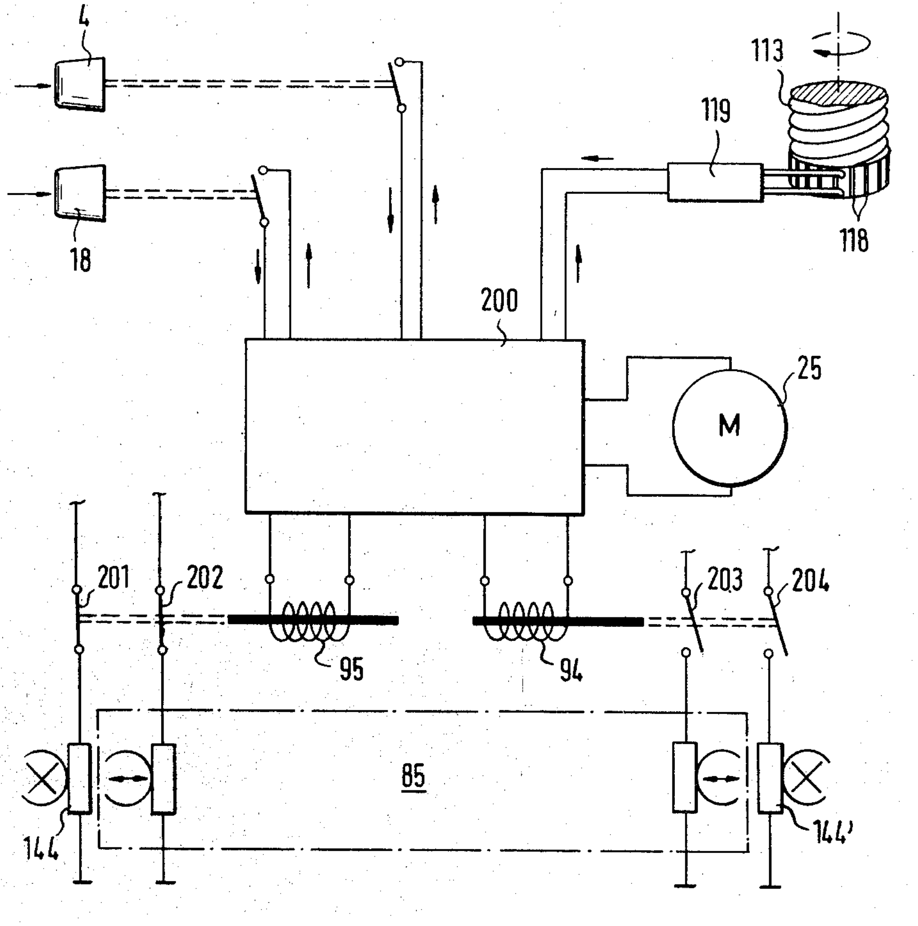
FIG. 11 shows a block circuit diagram.

FIG. 11 shows a block circuit diagram of the monitoring device. The electrical part comprises a transistor unit 200 which is connected with a sensing means 119 which slides on conducting pieces 118 on the counting mechanism worm 113. Each time when a conducting piece passes the sensing means, a switching circuit is closed, that is to say the transistor unit receives a voltage pulse. The transistor unit is further connected with an operating knob 18. When the operating button is depressed, the drive motor 25 is switched off when there are no pulses, that is to say when the tape 5 and thus the worm 113 comes to a halt. When the operating knob 18 is drawn out, in this case the transistor unit 200 brings about tape transport in the opposite direction. For this purpose it is connected with the two electro magnets 94, 95 so that when the tape comes to an end and thus halts, that electromagnet 94 or 95, which was under voltage, is de-energized and voltage is applied to the electromagnet which was previously de-energized. Accordingly, as mentioned above, one pressing roller 102, 102' is raised from the tape while the other is pressed against it. Simultaneously the one drive wheel 109, 109' is raised and the other is lowered. When the rewinding button 4 is actuated an electrical connection is brought about so controlling the transistor unit 200 that the drive motor is switched off when the tape comes to a halt.

The armatures of the electromagnets 94, 95 also actuate switches 201, 202, 203, 204 which switch on the associated sound heads 85 and erasing heads 144, 144' and switch them off.

We claim:

1. A magnetic tape recorder drive apparatus, comprising:

first and second stationary pins;

first and second spool drive spigots for mounting two tape spools, respectively, for free rotational movement on said first and second support pins, respectively, transport means for transporting tape between said tape spools at a constant speed;

magnetic head means for recording a signal on or reproducing a signal from said tape while said tape is moving between said two tape spools;

first and second driving wheels mounted on said first and second support pins, respectively, for free rotational and axial movement thereon;

first and second driven wheels journalled on said first and second support pins, respectively, between said driving wheels and said spool drive spigots for axial movement therealong, said driven wheels being connected to said spool drive spigots for rotation therewith;

first and second braking discs stationarily mounted on said first and second support pins, respectively, between said driving wheels and said driven wheels;

clutch means for axially moving said first driving wheel from a first position of disengagement from said first driven wheel, which in said first position, engages said first braking disc, into a second position wherein said first driving wheel engages said first driven wheel and said first driven wheel is disengaged from said first braking disc;

drive means for driving said driving wheels in opposite directions;

spring means disposed between each of said driving wheels and its associated spool drive spigots; and an abutment on the upper end of each of said support pins, said spring means pressing said driven wheels against said braking disc and said spool drive spigots against said abutments wherein, upon axial movement of said driving wheel into engagement with said driven wheel, the latter is disengaged from said braking disc against the action of the force of said spring means.

2. The structure as set forth in claim 1 further comprising, on the side of each driven wheel which is adjacent to the drive wheel and the braking disc, an annular frictional coating with an inner part for abutting against the braking disc and an outer part for abutting against a face on the drive wheel, and in which the spring means each comprise two signal helical springs, whose one end engages the drive wheel and whose other end engages the spool driving spigot and which applies a first defined pressing force with which the inner part of the frictional lining is pressed against the braking disc and which in a certain raised position of the driving wheel and the driven wheel delivers a second defined pressing force with which the outer part of the frictional lining is pressed against the face of the driving wheel and which further makes possible an axial displacement of the spool entraining spigot.

3. The structure as set forth in claim 2 in which the spool driving spigots have blind prismatic holes and the driven wheels are provided with boss-shaped projections matching the cross section of these holes, the associated spool driving spigots being mounted in a sliding manner on the respective projections, and in which there is a stationary abutment on the respective pin extending into the blind hole of the spool driving spigot and against this abutment there abuts the end face, associated with the spool driving shaft, of the boss-shaped extension in the rewinding position of the driving wheel and of the driving wheel when the latter is raised and in which the means which drive the driving wheels in opposite directions comprise a motor which during operation of the magnetic tape apparatus runs in the same direction and whose shaft carries a stepped drive pulley on which a belt runs which passes around the drive wheels for driving them in opposite directions, the apparatus further comprising an operating fork which urges the drive belt on to a step of greater diameter on the pulley for rewinding the tape.

4. The drive apparatus according to claim 1, wherein:
said transport means comprises first and second flywheels, at least one capstan driven by one of said flywheels and at least one pressing roller for pressing said tape against said capstan;
and said apparatus further comprises:
a drive motor which rotates in only a single direction of rotation and at a constant speed; and
further drive means connecting said drive motor with said first and second flywheels for driving said flywheels in opposite directions.

5. A magnetic tape recorder drive apparatus, comprising:
first and second stationary support pins;
first and second spool drive spigots for mounting two tape spools, respectively, for free rotational movement on said first and second support pins, respectively;
transport means for transporting tape between said tape spools at a constant speed;
magnetic head means for recording a signal on or reproducing a signal from said tape while said tape is moving between said two tape spools;
first and second driving wheels mounted on said first and second support pins, respectively, for free rotational and axial movement thereon;
first and second driven wheels journalled on said first and second support pins, respectively, between said driving wheels and said spool drive spigots for axial movement therealong, said driven wheels being connected to said spool drive spigots for rotation therewith;
first and second braking discs stationarily mounted on said first and second support pins, respectively, between said driving wheels and said driven wheels;
clutch means for axially moving said first driving wheel from a first position of disengagement from said first driven wheel, which in said first position, engages said first braking disc, into a second position wherein said first driving wheel engages said first driven wheel and said first driven wheel is disengaged from said first braking disc;
drive means for driving said driving wheels in opposite directions;
said spool drive spigots each having a blind hole with a prismatic cross section, said driven wheels each having a boss-shaped male projection matching said prismatic cross section, said spool drive spigots being slideable on the boss projection of its associated driven wheel; and
a stationary abutment on each of said support pins located in said blind hole, wherein the end face of the associated boss projection is urged against said abutment when said driving wheel has been moved a predetermined distance.

6. The structure as set forth in claim 5 further comprising two spaced flywheels and means for driving the flywheels in opposite directions, capstans carried by the respective flywheels, pressing rollers associated with the respective capstans, two electromagnets with armatures arranged to be connected by the electromagnets, a fork connecting means between the armatures and the fork, the fork engaging one of the drive wheels and on the other hand being connected with one of the pressing rollers so that on excitation of one of the electromagnets one drive wheel is raised out of the first position into the second position and one of the pressing rollers is pressed against the first capstan so as to engage the tape, while on excitation of the other electromagnet the other drive wheel is raised and the other pressing roller is pressed against the second capstan.

7. A magnetic tape recording drive apparatus, comprising:
first and second spaced flywheels;
first and second capstans driven by said first and second flywheels, respectively;
first and second pressing rollers disposed adjacent said first and second capstans, respectively, for pinching a tape therebetween to drive said tape in a given direction;
first and second spaced rotatable driving wheels;
first and second spaced spool drive spigots for mounting tape spools thereon;
clutch means for engaging one of said drive wheels with its associated spool drive spigot in a first position thereof;
brake means for braking said associated spool drive spigot in a second position of said clutch means;
a drive motor rotating in the same direction for each of a plurality of operating states of said tape recording apparatus;
first connecting means connecting said drive motor to said flywheels for rotating said flywheels, and thereby said capstans, in opposite directions;
second connecting means connecting said drive motor to said driving wheels for driving said drive wheels in opposite directions;
selection means for selectively engaging one of said capstans with its associated pressing roller for driving said tape in a given direction;
means for defining an insertion slot for a commercially available tape cartridge;
a resiliently loaded cartridge receiving part associated with the slot;
driving openings in the spools of the cartridge being arranged to be aligned with the spool driving spigots when the cartridge is inserted;
an actuating device by means of which the cartridge receiving part is pressed against a spring force in a direction perpendicular to the direction of insertion of the cartridge towards the drive wheel, the spool spigots being arranged to be capable of moving back resiliently; and
ejection means which eject the cartridge out of the slot when the actuating means is moved in the opposite direction.

8. A magnetic tape recording drive apparatus, comprising:
first and second spaced flywheels;
first and second capstans driven by said first and second flywheels, respectively;
first and second pressing rollers disposed adjacent said first and second capstans, respectively, for pinching a tape therebetween to drive said tape in a given direction;
first and second spaced rotatable driving wheels;
first and second spaced spool drive spigots for mounting tape spools thereon;

clutch means for engaging one of said drive wheels with its associated spool drive spigot in a first position thereof;

brake means for braking said associated spool drive spigot in a second position of said clutch means;

a drive motor rotating in the same direction for each of a plurality of operating states of said tape recording apparatus;

first connecting means connecting said drive motor to said flywheels for rotating said flywheels, and thereby said capstans, in opposite directions;

second connecting means connecting said drive motor to said driving wheels for driving said drive wheels in opposite directions; and selection means for selectively engaging one of said capstans with its associated pressing roller for driving said tape in a given direction.

9. A magnetic tape recording drive apparatus according to claim 8, wherein said selection means comprises:

first and second electromagnets;

first and second forked members engaging said first and second drive wheels, respectively;

first control means connecting said first electromagnet to said first forked member and to said first pressing roller, wherein when said first electromagnet is energized said control means engages said first forked member to move said first driving wheel into engagement with said first driven wheel and said first pressing roller into engagement with said first capstan;

second control means connecting said second electromagnet to said second forked member and to said second pressing roller, wherein when said second electromagnet is energized said second control means engages said second forked member to move said second drive wheel into engagement with said second driven wheel and said second pressing roller into engagement with said second capstan; and means for selectively energizing said first and second electromagnets, respectively.

10. The structure as set forth in claim 8 in which the drive motor is so arranged that its shaft is substantially perpendicular in relation to the axes of the flywheels and the driving wheels and lies in the plane which is substantially parallel to the planes running through the tape spools, the flywheels and the drive wheels, the motor being provided with stub shafts at both ends which both lie outside of straight lines which are drawn perpendicular to the axes of the flywheels and the drive wheels, and belt pulleys fitted on the two stub shafts, one belt running over one of the respective pulleys and surrounding the drive wheels and flywheels externally.

11. A magnetic tape recorder drive apparatus, comprising:

first and second stationary support pins;

first and second spool drive spigots for mounting two tape spools, respectively, for free rotational movement on said first and second support pins, respectively;

transport means for transporting tape between said tape spools in one of two opposite directions at a constant speed, said transport means including first and second flywheels;

magnetic head means for recording a signal on or reproducing a signal from said tape while said tape is moving between said two tape spools;

first and second driving wheels mounted on said first and second support pins, respectively, for free rotational and axial movement thereon;

first and second driven wheels journalled on said first and second support pins, respectively, between said driving wheels and said spool drive spigots for axial movement therealong, said driven wheels being connected to said spool drive spigots for rotation therewith;

first and second braking discs stationarily mounted on said first and second support pins, respectively, between said driving wheels and said driven wheels;

clutch means for axially moving said first driving wheel from a first position of disengagement from said first driven wheel, which in said first position, engages said braking disc, into a second position wherein said first driving wheel engages said first driven wheel and said first driven wheel is disengaged from said first braking disc;

drive means for driving said driving wheels in opposite directions;

a drive motor;

first connecting means connecting said drive motor with said first and second flywheels for rotating said flywheels in opposite directions; and second connecting means connecting said drive motor with said first and second driving wheels for driving said driving wheels in opposite directions.

* * * * *